Aug. 29, 1967   R. G. MITCHELL ET AL   3,338,129
BRAIDED RUG AND METHOD OF MAKING SAME
Filed Jan. 10, 1964   4 Sheets-Sheet 1

INVENTORS
ROBERT G. MITCHELL
FRANCIS A. EGERT
BY
THEIR ATTORNEY

Aug. 29, 1967     R. G. MITCHELL ETAL     3,338,129
BRAIDED RUG AND METHOD OF MAKING SAME
Filed Jan. 10, 1964     4 Sheets-Sheet 2
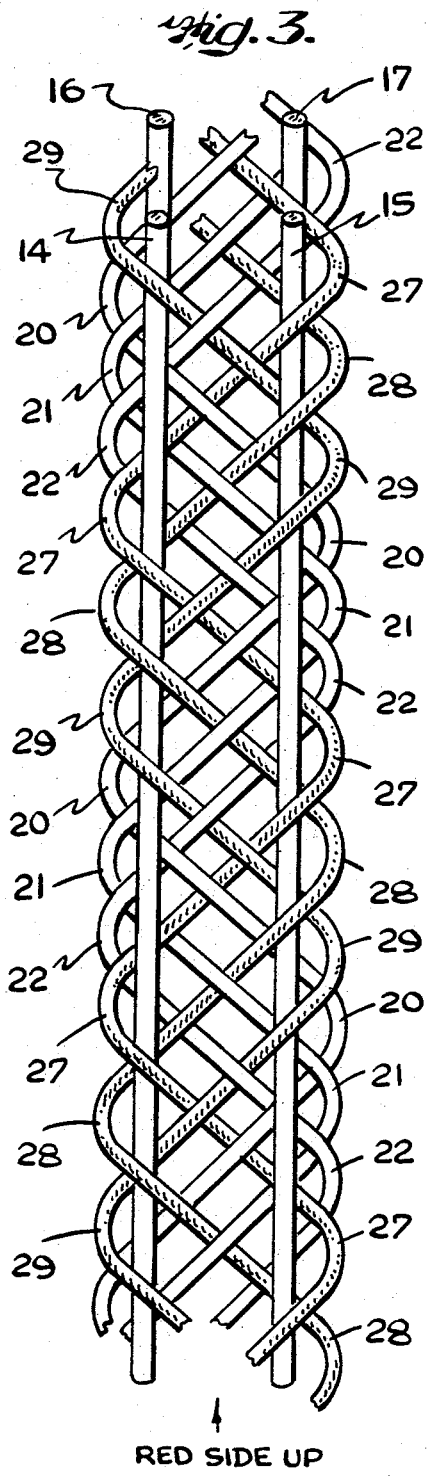
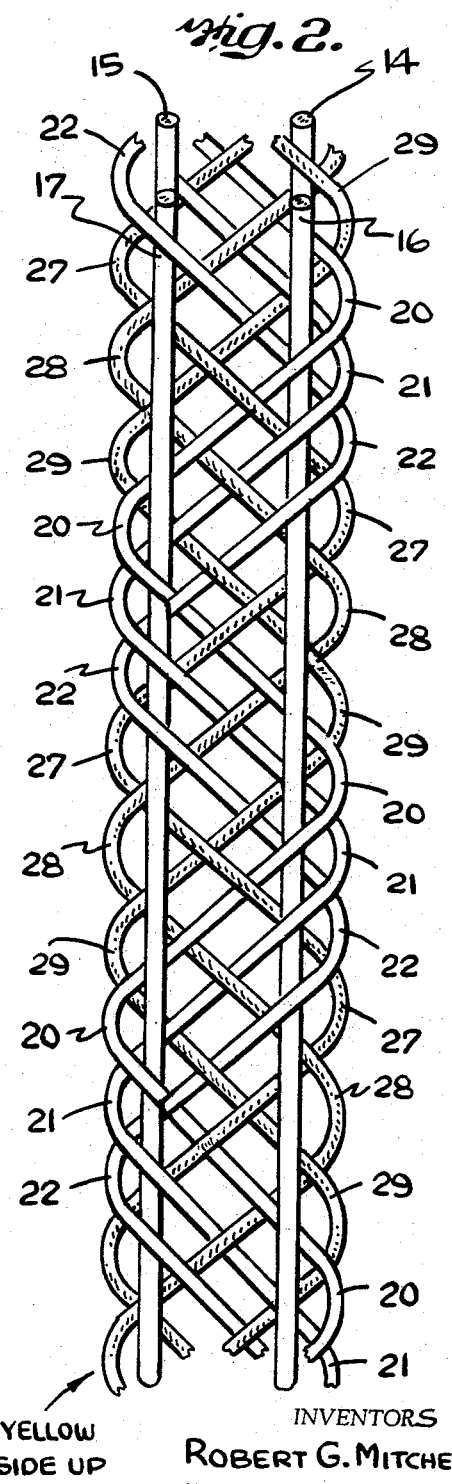
INVENTORS
ROBERT G. MITCHELL
FRANCIS A. EGERT
BY Peter Patane
THEIR ATTORNEY Aug. 29, 1967  R. G. MITCHELL ETAL  3,338,129
BRAIDED RUG AND METHOD OF MAKING SAME
Filed Jan. 10, 1964  4 Sheets-Sheet 3

INVENTORS
ROBERT G. MITCHELL
FRANCIS A. EGERT
BY Peter Patane
THEIR ATTORNEY

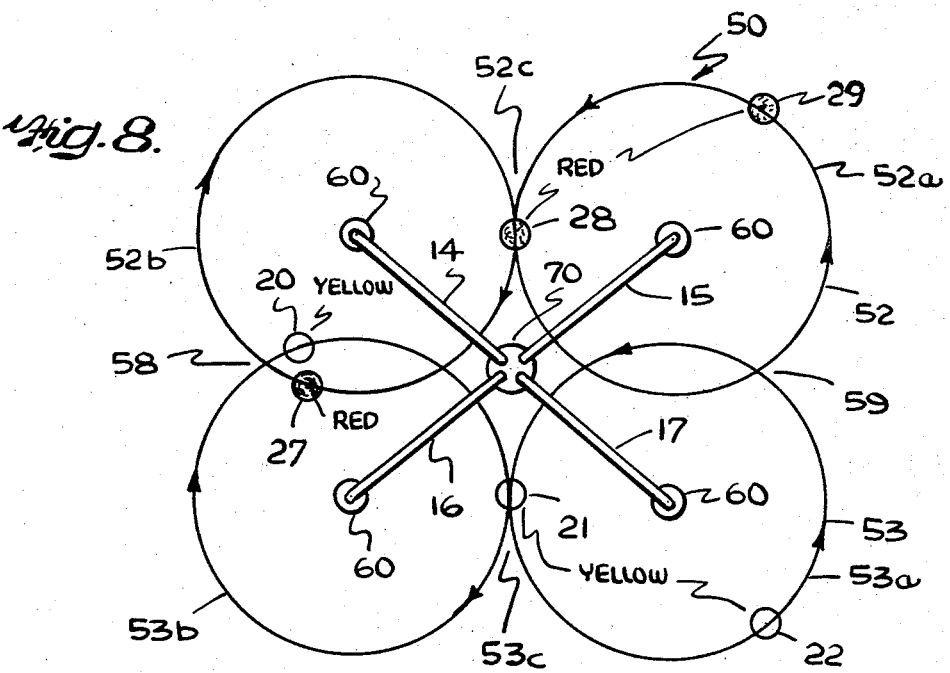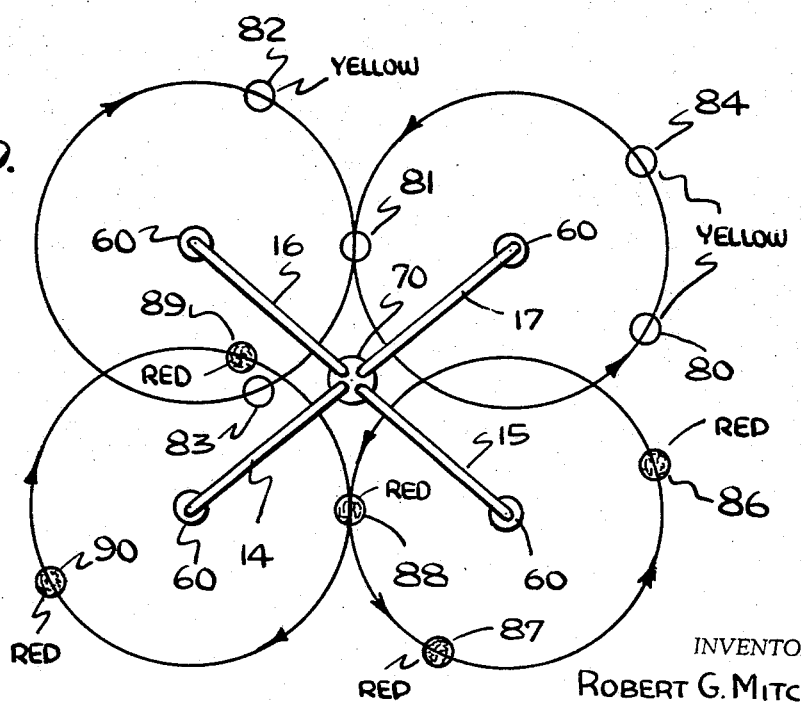

3,338,129
BRAIDED RUG AND METHOD OF
MAKING SAME
Robert G. Mitchell, Lafayette Hill, Philadelphia, and Francis A. Egert, Philadelphia, Pa., assignors to The Wool "O" Company, Philadelphia, Pa., a corporation of Pennsylvania
Filed Jan. 10, 1964, Ser. No. 336,935
11 Claims. (Cl. 87—7)

The invention relates to braids, the method of making them, and the apparatus for making them and it is an object to provide a modified braid, for a rug or the like, which will result in a different appearance on opposite sides or faces of the rug.

In making braided rugs or the like it is customary to first form the braid in long strips and to secure loops of the braid strips edgewise, such as by sewing thereof, in the desired configuration of the article to be made. Usually the braid has the same appearance on opposite sides or faces and, therefore, if the rug, for instance, that is made from the usual braid is reversed, its appearance will be the same as on the other side. It is a further object of this invention to provide a braid which is formed by surface yarns of different colors and/or patterns and braided so that the surface yarns of one color and/or pattern will appear on one side of the braid (and the resultant rug) and the surface yarns of the other color and/or pattern will appear on the other side of the braid.

In this invention, essentially the braid which results is a combination of two braids automatically superimposed one upon the other during the braiding operation and joined together without the use of any additional material whatsoever, the joining resulting from the manner in which the surface yarns are braided.

In one embodiment of this invention a flat braid is provided comprising two sets of cores in side-by-side relation. Two groups of surface yarns are braided about the two sets of cores, the first group of surface yarns having one color and/or pattern of colors and the second group of surface yarns having a different color and/or pattern of colors. During the braiding, the surface yarns of one group are interlocked with the surface yarns of the other group between the two sets of cores, the interlocking alternating along the lengths of the cores from being on one side between the cores of opposite sets to being on the other side between other cores of opposite sets.

The braiding action is in the shape of a figure 8 disposed on its side and each surface yarn interlocks twice but between the cores, with one surface yarn of the other group each time a figure 8 is completed.

The result of the foregoing arrangement and braiding action is that on one side of the braid only the surface yarns of one color and/or pattern of colors are visible and on the other side of the braid only the surface yarns of the other color and/or pattern of colors are visible.

The braid strips thus formed may then be joined edgewise or sidewise, as is usual, by stitching or other means, to form rugs or the like. Such rugs may then be turned from one side to the other side and the rug will have different colors and/or patterns of colors on its two sides.

The apparatus for forming the braid strip comprises essentially a plate defining two tracks of figure-8 configurations and movable in these tracks are two groups of carriers for surface yarns. The figure-8 tracks are disposed side-by-side and so that they overlap each other to define a common track zone.

Through the center of each circle defining the figure 8 extends a core and the surface yarns extend from the carriers and are braided about the cores as the carriers travel in the tracks about the cores. The movement of the carriers in the tracks is synchronized so that the same two carriers of opposite groups always pass through the common zones (between the cores) as the two carriers of opposite groups pass between the cores of opposite sets, the passing of the carriers through the common zone interlocking the surface yarns carried thereby.

The foregoing and other objects of the invention, and the best modes in which we have contemplated applying such principles will more fully appear from the following description and accompanying drawings in illustration thereof.

In the drawings,

FIG. 2 is a diagrammatic exploded view looking at the same side of the braid as in FIG. 1, to better show the relationship of the certain surface yarns to each other;

FIG. 3 is a diagrammatic view, similar to FIG. 2, but showing the rear face of the braid;

FIG. 8 is a diagrammatic plan view of apparatus for making the braid according to this invention;

FIG. 10 is a diagrammatic plan view of apparatus, similar to FIG. 9, but utilizing a larger number of carriers for the surface yarns to provide a modified braid.

Figure 1:
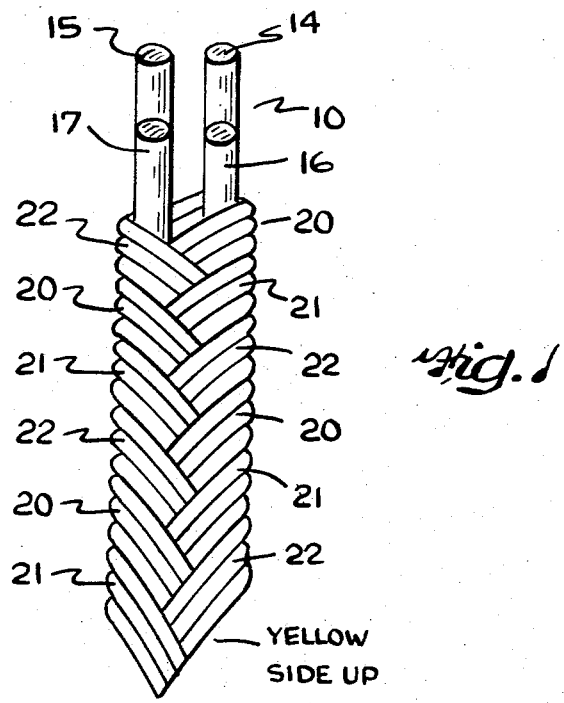
FIG. 1 is a view of the front face of a segment of a braid formed in accordance with this invention.

Referring to the drawings, FIG. 1 illustrates the braid 10 provided by this invention which comprises a first set of cores or fillers 14 and 15 and a facing second set 16 and 17. The cores 14 and 15 are placed side-by-side with each other and are used to form the face nearest to the viewer, as viewed in FIG. 3, and the cores 16 and 17 are placed side-by-side, with each other and are used to form the face farthest from the viewer in FIG. 3. About the cores 14 and 15 is braided a first group of surface yarns 27, 28 and 29 and about the second set of cores 16 and 17 is braided a second group of surface yarns 20, 21 and 22.

Preferably the two groups of surface yarns are distinctive, i.e., the color of the first group of surface yarns is different from the color of the second group of surface yarns, for instance, the surface yarns 20, 21 and 22 may be yellow and the surface yarns 27, 28 and 29 may be red. Alternately, if desired, the first group of surface yarns 20, 21 and 22 may have one color pattern and the second group of surface yarns 27, 28 and 29 another color pattern.

The two groups of surface yarns are braided about the cores simultaneously and each surface yarn in being so braided traverses a figure-8 shape and interlocks, between the two sets of cores, with a surface yarn of the other group twice when a figure 8 is completed.

Figure 4:
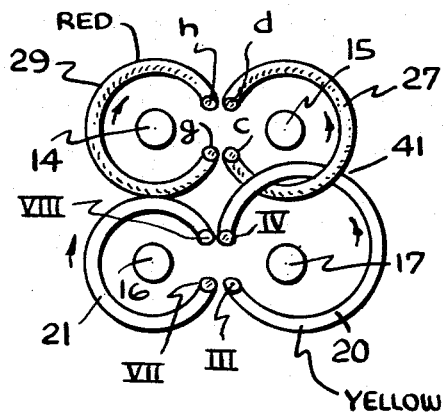
FIGS. 4 and 5 are diagrammatic section views taken along the length of the braid.
Figure 5:
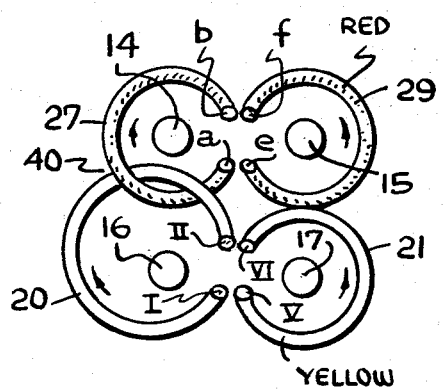

For example, referring to FIGS. 5 and 8, as the surface yarn 27 is wound about the core 14 in the direction from *a* to *b* (clockwise), the surface yarn 20 is simultaneously wound about the core 16 in the opposite direction from I to II (clockwise), the two surface yarns interlocking between the cores 14 and 16 because the yarn 27 passes behind (under) the yarn 20 and over it (FIG. 5) to form an interlock 40. The surface yarn 27 is then wound about the core 15, FIG. 4, from *c* to *d* (counterclockwise) while the surface yarn 20 is simultaneously wound about the core 17 from III to IV (counterclockwise), the two surface yarns interlocking between the cores 15 and 17 by the yarn 27 passing behind (under) the yarn 20 to form the interlock 41.

Referring to FIG. 5 it is seen that no interlock takes place between the portions of the surface yarns 21 and 29 as they wrap around the cores 17 and 15, respectively, from V to VI and from $e$ to $f$. Likewise, in FIG. 4, no interlock takes place between the portions of the surface yarns 21 and 29 as they wrap around the cores 16 and 14, respectively, from VII to VIII and from $g$ to $h$. However, when any pair of surface yarns 20 and 27, 21 and 28, or 22 and 29 have both completed figure-8 shapes about the cores two interlocks have taken place, one between the cores 14 and 16, FIG. 5, and one between the cores 15 and 17, FIG. 4, the interlocks being axially spaced from each other along the length of the cores, whereby the surface yarns may be seen only on one side of the braid and not on the other side.

In the drawings each of the surface yarns 20, 21, 22, 27, 28, and 29 has been illustrated as formed by a group of three strands but more or less strands may form each surface yarn, as desired.

Figure 6:
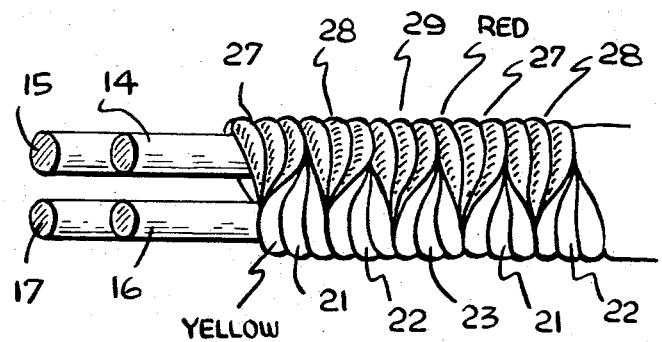
FIG. 6 is a side view of the braid segment illustrated in FIG. 1.

The braid is tightly and closely woven, as illustrated in FIG. 1, and the foregoing construction results in a relatively flat braid in which the surface yarns of one distinction, i.e., of one color or pattern of colors, are seen only on one side of the braid (and the resultant rug made therefrom) and the yarns of the other distinction, i.e., another color pattern of colors, are seen only on the other side of the braid. While in FIGS. 4 and 5, for purposes of illustration the surface yarn 20 is shown traversing a circle of larger diameter than the other surface yarns, and forming a bulge at the side, in the actual braid no such bulge exists, as illustrated in FIGS. 1 and 6.

The apparatus 50, shown diagrammatically in FIG. 8, for making the braid aforedescribed may comprise a flat plate in which are disposed two tracks 52 and 53 of approximate figure-8 shape. The track 52 is formed by approximate circles 52a and 52b (or ellipses open at adjacent ends) and the track 53 by approximate circles 53a and 53b (or ellipses open at adjacent ends), the circles of one track having common tangential portions 52c and 53c, as illustrated.

The side-by-side tracks 52 and 53 overlap, as illustrated, to define common track zones 58 and 59.

Movable in the track 52 is a first group of three carriers for the surface yarns 27, 28 and 29 and movable in the track 53 is a second group of three carriers for the surface yarns 20, 21 and 22.

The carriers of each group are initially staggered about the tracks, as illustrated, and move sequentially about the tracks. The carrier for surface yarn 27 is paired with the carrier for the surface yarn 20 so that in traversing the figure-8 shapes they meet in the common track zone 58, as illustrated in FIG. 8, the carrier for the surface yarn 27 arriving first and leaving the common track zone 58 after the carrier for the surface yarn 20 has entered, thereby interlocking the surface yarns. The carriers for the surface yarns 27 and 20 proceed along their respective tracks 52 and 53 and in due course the carrier for the surface yarn 27 will arrive first at the common track zone 59 and leave this zone after the carrier for the surface yarn 20 has entered it, thereby forming another interlock between the surface yarns 20 and 27 as they wrap about the cores 17 and 15.

Since the carriers for surface yarns 20 and 27 enter the common zone 58 from opposite ends, they could be arranged to enter the common zone simultaneously. But so long as both the carriers for the surface yarns 20 and 27 are in the common zone 58 at the same time to some extent, an interlock will take place between the yarns 20 and 27, regardless of their respective entry times into the common zone 58.

A similar braiding action to that described for surface yarns 20 and 27 takes place between the pair of surface yarns 21 and 28 and between the pair of surface yarns 22 and 29.

Figure 9:
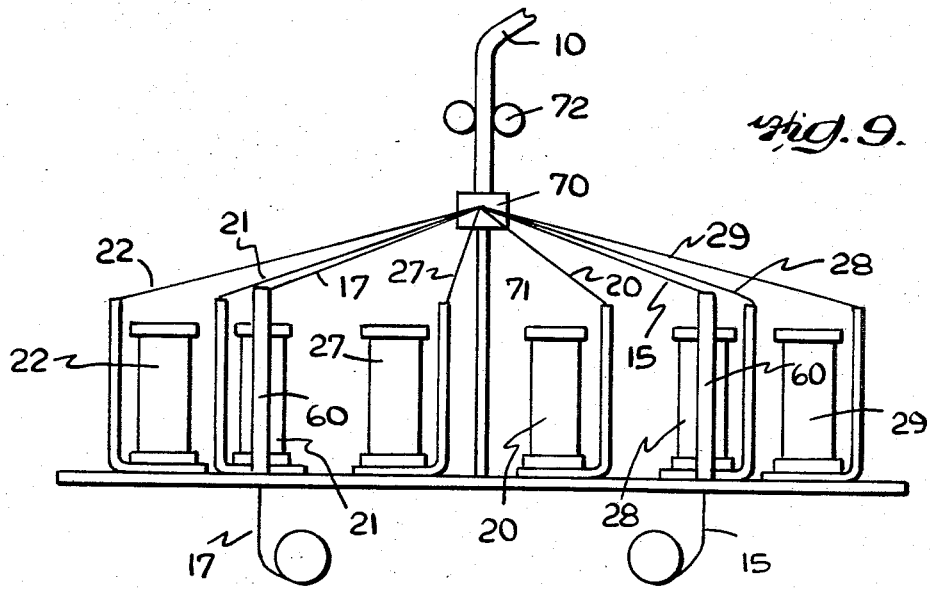
FIG. 9 is a diagrammatic side view of the apparatus illustrated in FIG. 8, but at an enlarged scale, and looking at the apparatus of FIG. 8 from the right hand side in FIG. 8.

The cores or fillers 14, 15, 16 and 17 extend from spools below the plate through holes located in the center of the circles 52a, 52b, 53a and 53b and the cores 14, 15, 16 and 17 extend upward through pipes 60 (FIG. 9) and then slope toward the central part of the two figure-8 shapes and enter a guide device 70 supported above the plate and in spaced relation thereto by a column 71.

In starting the operation, the ends of the surface yarns 20, 21, 22, 27, 28 and 29 and the cores 14, 15, 16 and 17 are tied together and fed through the device 70 and between two gears 72 which are synchronized with the braiding action of the apparatus and which move the braid upward as it is formed.

Thus, it is seen that the carriers for the surface yarns 27, 28 and 29 move about the figure-8 track 52 and in so doing wrap or braid themselves about the cores 14 and 15. Simultaneously, the carriers for the surface yarns 20, 21 and 22 move about the figure-8 track 53, and braid themselves about the cores 16 and 17. The carriers are disposed about the tracks 52 and 53 so that when one carrier enters the track in the common zone 58 or 59 another carrier from the other track will also enter the portion of its track in the common zone. Interlocking thus takes place as the carriers pass one another in the common zone.

FIG. 6 is a side view of a braid incorporating this invention as heretofore described and illustrates in conjunction with FIG. 1 that the surface yarns 20, 21 and 22 are seen on one side of the braid only whereas the surface yarns 27, 28 and 29 are seen on the other side only.

Figure 7:
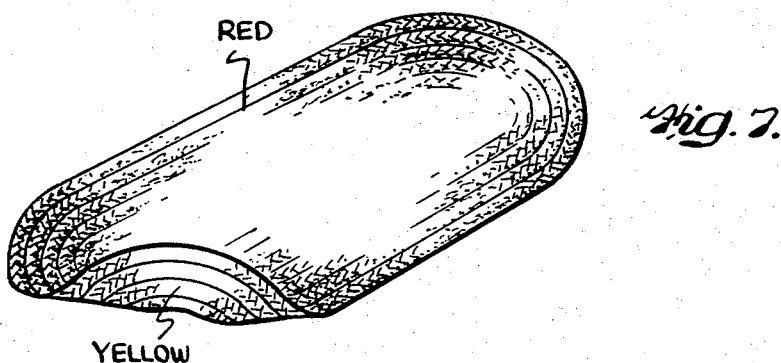
FIG. 7 is a plan view of a braided rug incorporating this invention.

FIG. 7 illustrates a typical braided rug made by looping upon itself a continuous trip of braid made in accordance with this invention and stitching or otherwise securing the adjacent edges.

FIG. 10 diagrammatically illustrates a modified apparatus similar to that illustrated in FIG. 8 wherein five carriers are used for the surface yarns 80, 81, 82, 83 and 84 of the first group and five other carriers are used for the second group of surface yarns 86, 87, 88, 89 and 90 instead of the three in each group as are used in the embodiment of FIG. 4. It will be understood that the number of carrires in each group may be increased or decreased but so long as the surface yarns of the two groups traverse the figure-8 shapes as heretofore described the interlocking will take place.

Having described the invention, what is claimed is:

1. A braid comprising facing sets of cores and surface yarns, some surface yarns being braided about one set of cores, other surface yarns being braided about another set of cores, and the surface yarns braided about one set of cores being connected with the other surface yarns braided about the other set of cores.

2. A flat braid comprising two facing sets of cores, two groups of surface yarns braided about said cores, one group of surface yarns being braided about one set of cores, the other group of surface yarns being braided about the other set of cores, and the surface yarns of one group being interlocked only with the surface yarns of the other group between the sets of cores.

3. A braid comprising two sets of cores, two groups of surface yarns braided about said cores, one group of surface yarns being braided about one set of cores in a figure-8 shape, the other group of surface yarns being braided about the other set of cores in a figure-8 shape, and the surface yarns of one group being interlocked with the surface yarns of the other group between the sets of cores in the figure-8 shapes.

4. The method of making a braid comprising braiding one group of surface yarns about one set of cores, simultaneously braiding another group of surface yarns about another set of cores, and interlocking said surface yarns between and along said sets of cores during said braiding.

5. The method of making a braid for a rug or the like having a different appearance on opposite sides comprising braiding a group of surface yarns about a set of cores in the general shape of a figure 8 on its side, braiding a different group of surface yarns about a different set of cores in the general shape of a figure 8 on its side, and interlocking twice every surface yarn of one group with a surface yarn of the other group each time a figure 8 is completed.

6. The method of making a braid for a rug or the like having a different appearance on opposite sides and comprising two sets of cores and two groups of surface yarns by braiding one group of surface yarns of one distinction about one set of cores in the general shape of a figure 8 on its side, braiding another group of surface yarns of another distinction about the other set of cores in the general shape of a figure 8 on its side, and interlocking every surface yarn of one group with a surface yarn of the other group each time a figure 8 is completed.

7. The method of making a braid for a rug or the like having a different appearance on opposite sides and comprising two sets of cores and two groups of surface yarns by braiding one group of surface yarns of one distinction about one set of cores in the general shape of a figure 8 on its side, braiding another group of surface yarns of another distinction about the other set of cores in the general shape of a figure 8 on its side, and interlocking twice every surface yarn of one group with a surface yarn of the other group each time a figure 8 is completed between the two sets of cores.

8. A braided rug or the like comprising a braid strip looped upon itself, each braided loop being joined along its edges to the adjacent loop, each braid being made with cores and yarns entirely of one distinction on one side and yarns entirely of another distinction on the other side, and said yarns of one distinction being interlocked with said yarns of the other distinction.

9. A braided rug or the like comprising a continuous braid looped upon itself and having the adjacent edges of the loops connected together, said braid comprising facing sets of cores and surface yarns, each set of surface yarns being braided about one set of cores only, and the surface yarns braided about one net of cores being connected with the other surface yarns braided about the other set of cores, whereby a rug or the like having opposite sides formed by different surface yarns results.

10. A braided rug or the like comprising a looped braid whose adjacent edges are secured together, said braid comprising two sets of cores, two groups of surface yarns braided about said cores, one group of surface yarns being braided about one set of cores, the other group of surface yarns being braided about the other set of cores, and the surface yarns of one group being interlocked with the surface yarns of the other group between the sets of cores.

11. A braided article of manufacture comprising a looped braid whose adjacent edges are secured together, said braid comprising two sets of cores, two groups of surface yarns braided about said cores, one group of surface yarns being braided about one set of cores in a figure-8 shape, the other group of surface yarns being braided about the other set of cores in a figure-8 shape, and the surface yarns of one group being interlocked with the surface yarns of the other group between the sets of cores in the figure-8 shapes.

References Cited
UNITED STATES PATENTS

| | | | |
|---|---|---|---|
| 377,320 | 1/1888 | McCahey | 87—8 |
| 1,381,832 | 6/1921 | Heidenheim | 161—35 X |
| 1,452,776 | 4/1923 | Bacon | 161—35 |
| 1,487,860 | 3/1924 | Kalbach | 87—7 |
| 1,664,497 | 4/1928 | Waite | 161—35 |
| 1,692,651 | 11/1928 | Greenspan | 87—7 |
| 1,717,215 | 6/1929 | Huber | 87—7 X |
| 2,096,592 | 10/1937 | Petersen | 87—30 |
| 2,126,254 | 8/1938 | Gowell. | |
| 2,315,837 | 4/1943 | Brown | 87—7 X |
| 3,142,885 | 8/1964 | Capel | 161—35 X |
| 3,153,366 | 10/1964 | Iwai | 87—7 |

FRANK J. COHEN, *Primary Examiner.*

J. PETRAKES, *Examiner.*